US006171681B1

(12) United States Patent
Mascarenhas et al.

(10) Patent No.: US 6,171,681 B1
(45) Date of Patent: *Jan. 9, 2001

(54) CLING FILM AND ARTICLES

(75) Inventors: Oscar C. Mascarenhas, Cuyahoga Falls; Mitchell J. Rackovan, Madison; Gerald G. Popely, Mentor; Melvin S. Freedman, Beachwood, all of OH (US)

(73) Assignee: Avery Dennison Corporation, Pasadena, CA (US)

( * ) Notice: Under 35 U.S.C. 154(b), the term of this patent shall be extended for 0 days.

This patent is subject to a terminal disclaimer.

(21) Appl. No.: 09/145,935

(22) Filed: Sep. 3, 1998

Related U.S. Application Data

(63) Continuation-in-part of application No. 09/811,337, filed on Mar. 4, 1997, now Pat. No. 5,888,615.

(51) Int. Cl.$^7$ ............................. B32B 27/30; B32B 27/32
(52) U.S. Cl. ..................... 428/141; 428/213; 428/219; 428/220; 428/352; 428/441; 428/461; 428/462; 428/521
(58) Field of Search ..................................... 428/141, 213, 428/219, 220, 352, 441, 461, 462, 500, 521

(56) References Cited

U.S. PATENT DOCUMENTS

| | | | |
|---|---|---|---|
| 4,133,923 | * 1/1979 | Blunt ....................................... | 428/35 |
| 5,100,709 | * 3/1992 | Barger et al. ........................... | 428/41 |
| 5,175,049 | * 12/1992 | Huff et al. ............................. | 428/218 |

* cited by examiner

*Primary Examiner*—D. S. Nakarani
(74) *Attorney, Agent, or Firm*—Renner, Otto, Boisselle & Sklar

(57) ABSTRACT

In one embodiment, the invention relates to an ink-imprinted and reusable multilayer cling film of at least one layer for use in combination with a substrate having a rigid smooth surface comprising a non-vinyl flexible polymer cling film which has two smooth surfaces, is substantially free of added plasticizer and provides a 180° peel force after application to glass of from about 30 to about 2500 gms after aging in a 140° F. oven for 72 hours.

In another embodiment, the invention relates to an ink-printed and reusable multilayer cling film of at least two layers which can cling to substrates having a rigid smooth surface without the use of an adhesive material. For example, such multilayer cling film may comprise: (A) a first layer of at least one thermoplastic polymer film having an ink-imprinted upper surface and a smooth lower surface; and (B) a second layer which is a polymeric cling film having an upper surface and a lower surface and comprising at least one non-vinyl thermoplastic elastomer wherein the upper surface of the second layer is in contact with and adhered to the lower surface of the first layer.

In yet another embodiment, the invention relates to an article comprising a substrate having a rigid smooth surface and an ink-imprinted flexible polymeric cling film of at least two layers which are affixed to the smooth surface of the substrate without adhesive whereby the cling film is removably adhered to the substrate.

37 Claims, No Drawings

CLING FILM AND ARTICLES

CROSS-REFERENCE TO RELATED APPLICATIONS

This application is a Continuation-In-Part of U.S. application Ser. No. 09/811,337, filed Mar. 4, 1997, now U.S. Pat. No. 5,888,615.

FIELD OF THE INVENTION

This invention relates to films, and more particularly, to ink-printed cling films which are essentially free of added plasticizer or tackifier and which can cling to rigid smooth surfaces without the use of an adhesive material. The films may be monolayer films or multilayer films. The invention also relates to articles comprising a substrate having a rigid smooth surface and a cling film removably adhered to the substrate.

BACKGROUND OF THE INVENTION

The term "cling film" as used in the specification and claims may be defined as a polymeric film that adheres directly to a substrate having a smooth surface such as glass, plastic, paper, wood, metal, etc., without the use of glues or adhesives. Cling films can be readily removed from the substrate and reapplied to the same or a different substrate a number of times. Cling films are usually highly flexible polymeric films that cling to a variety of surfaces by cohesion or as a result of a vacuum that is formed when the flexible smooth film is applied to a smooth, rigid surface such as glass, and in some cases to a light matte or textured surface such as in the front of a refrigerator.

Stretch cling films having a wide variety of applications have been known and used for many years for bundling packaged food and other goods. One application of particular interest for the stretch cling films is the bundling of goods for shipping and storage, for example, the bundling of large rolls of carpet, fabric, or the like. Another important and widely used bundling application is the containment and unitization of pallet loads. In these applications, a wrapping cling film is stretched tightly around an article or group of articles, and self-sealed in the stretched condition. In these application, it is essential that the films have cling properties in the stretched state. Good printability is not a requirement.

The present invention is not concerned with stretch cling films, but rather, films which have cling properties in the unstretched state. The cling films of the present invention, particularly when ink-imprinted with a message or design are useful in advertising such as in point of purchase advertising. The unique ability of the cling film to stick to a surface without adhesive is desirable for constant changing of point of purchase advertising. For example, cling films containing a message or design are particularly useful when there is a need for a decal on a product for promotional reasons. Examples include the fronts of refrigerators or microwave ovens where advertising helps to explain the various features of the product. Cling films also are used for advertising products on storefront windows, freezer cases and walk-in coolers. Cling films which have high clarity or can be totally opaque are particularly useful for such purposes.

An important advantage of using a cling film as opposed to an adhesive-backed decal in any application is that the cling film can be easily removed from a substrate without leaving residue.

A recent high volume use of cling film (in particular, vinyl film) has been in the "oil lube sticker" market. When an oil change is obtained at a commercial establishment, the clear cling film sticker is often applied in the upper left-hand corner of the automobile window that informs the owner of the vehicle when the oil in the vehicle should be replaced. The sticker can be easily removed and replaced with a new sticker.

Most of the cling films which have been used are vinyl chloride films (PVC) which have been used extensively because such films are highly flexible, particularly when they contain additives such as plasticizers and/or tackifiers. Generally, the vinyl cling films are calendered films as opposed to extruded or cast films. The films generally comprise 45% to 50% by weight of PVC resin, stabilizers and pigment, and the remainder is a plasticizer such as dioctyl phthalate (DOP). The thicknesses of the film range from about 0.004 to 0.014 inches with both surfaces being double polished. The cling film is generally supplied with a release liner which is usually paper or paperboard stock either with a castcoated or polycoated surface on one side. The cast coating is a clay, and the backside is either free of coating or has a light starch sizing.

It has been known for many years that tackifiers and plasticizers can be added to a polymer to give the polymer the necessary tackiness or cling to adhere to other smooth surfaces. Examples of tackifying additives include surfactants, polybutene, terpene resins, hydrogenated rosins, alkali metal and glycerol stearates and oleates and rosin esters. The use of tackifiers has disadvantages. While tackifiers are known in the art to enhance cling in an olefin cling film, the presence of the tackifier may cause blending difficulties during film manufacture and/or adversely affect optical properties of the film. Another disadvantage of tackifiers, plasticizers and surfactants is that they have a tendency to migrate to the surfaces of the film, and although it has been suggested that such migration to the surfaces enhances the cling properties of the film, the presence of the tackifiers and plasticizers on the surfaces of the films generally reduces the ability of the film to be ink-imprinted. The presence of the tackifiers at the surface also can cause damage to the substrate to which the cling film has been attached.

In addition, the presence of plasticizers and tackifiers in cling films such as vinyl cling films has, in recent years, been the subject of protest by various environmental groups who are opposed to the use of halogenated polymers such as polyvinyl chloride and to the use of certain additives such as the dioctyl phthalate plasticizer commonly used in PVC films.

Accordingly, there is a need for cling films which can replace the vinyl films which can be reapplied after being peeled from a smooth surface, and which do not require the use of plasticizers or tackifiers.

SUMMARY OF THE INVENTION

In one embodiment, the invention relates to an ink-imprinted and reusable multilayer cling film of at least one layer for use in combination with a substrate having a rigid smooth surface comprising a non-vinyl flexible polymer cling film which has two smooth surfaces, is substantially free of added plasticizer and provides a 180° peel force after application to glass of from about 30 to about 2500 gm after aging in a 140° F. oven for 72 hours.

In another embodiment, the invention relates to an ink-printed and reusable multilayer cling film of at least two layers which can cling to substrates having a rigid smooth surface without the use of an adhesive material. For example, such multilayer cling film may comprise: (A) a first layer of at least one thermoplastic polymer film having an ink-imprinted upper surface and a smooth upper surface; and (B) a second layer which is a polymeric cling film having an upper surface and a lower surface and comprising at least one non-vinyl thermoplastic elastomer wherein the upper surface of the second layer is in contact with and adhered to the lower surface of the first layer.

In yet another embodiment, the invention relates to an article comprising a substrate having a rigid smooth surface and an ink-imprinted flexible polymeric cling film of at least two layers which is affixed to the VD smooth surface of the substrate without adhesive whereby the cling film is removably adhered to the substrate.

DESCRIPTION OF THE PREFERRED EMBODIMENTS

The present invention relates to polymeric cling films, and, in a first embodiment, the invention relates to ink-imprinted polymeric cling films of at least one layer comprising a non-vinyl, flexible polymer cling film which has two smooth surfaces, is substantially free of added plasticizer and provides a 180° peel strength after application to the substrate of from about 30 to about 2500 gms, and more often, a peel strength of from about 30 or 50 to about 200 gms after aging in a 140° F. oven for 72 hours. The flexible polymer cling film generally comprises at least one layer of at least one thermoplastic polymer, and more particularly, at least one thermoplastic elastomer which is ink-imprintable.

In a preferred embodiment the polymeric cling films comprise at least 2 layers: a cling layer and a top film of thermoplastic polymer which is ink-imprintable on the face surface of the cling layer. This provides greater flexibility and an improved product because the polymers for each of the layers can be selected to enhance and maximize the desired properties of the two layers. That is, the polymer for the cling layer can be selected to enhance and maximize the desired cling properties (initially and after aging), and the polymer for the top film can be selected to provide superior ink-imprintability.

Various thermoplastic elastomers can be utilized. Commercially available thermoplastic elastomers (TPE) are either block copolymers (e.g., styrenics, copolyesters, polyurethanes and polyamides) or elastomer/thermoplastic compositions such as thermoplastic elastomeric olefins (TEO) and thermoplastic vulcanizates (TPV).

In one embodiment, the thermoplastic elastomer may be a copolymer rubber of ethylene and an alpha-olefin containing from 3 to about 18 carbon atoms such as propylene, 1-butene, 1-pentene, etc. Alpha-olefins of from 3 to 6 carbon atoms are preferred due to economic considerations, and the most preferred copolymers are those comprised of ethylene and propylene.

The copolymers of ethylene and other alpha-olefins such as propylene may contain other polymerizable monomers. Typical of these other monomers may be non-conjugated dienes such as the following non-limiting examples:

(a) straight chain acyclic dienes such as: 1,4-hexadiene, and 1,6-octadiene;

(b) branched chain acyclic dienes such as: 5-methyl-1,4-hexadiene, and 3,7-dimethyl-1,6-octadiene;

(c) single ring alicyclic dienes such as: 1,4-cyclohexadiene, and 1,5-cyclooctadiene; and (d) multi-ring alicyclic fused and bridged ring diene such as: tetrahydroindene, dicyclopentadiene, bicyclo-2,2,1-hepta- 2,5-diene, norbornenes such as 5-methylene-2-norbornene (MNB), 5-ethylidene-2-norbornene (ENB), and 5-propylene-2-norbornene (PNB).

Of the non-conjugated dienes typically used to prepare such copolymers, dienes containing at least one of the double bonds in a strained ring are preferred, and the most common of such dienes are dicyclopentadiene and 5-ethylidene-2-norbornene (ENB). The amount of the diene (on a weight basis) in the copolymer should be from 0% to about 20% with 0% to 10% being most preferred.

The most preferred ethylene alpha-olefin copolymers for the cling films of the invention are ethylene-propylene or ethylene-propylenediene copolymers. In either event, the average ethylene content of the copolymer could be as low as about 20% and as high as 90% to 95% on a weight basis. The remainder is either propylene or diene. In a preferred embodiment, the copolymers will contain from about 50% or 60% by weight up to about 80% by weight of ethylene.

The ethylene-based copolymers useful in the cling films of the invention are generally characterized by a Mooney viscosity, ML (1+4) 100° C. of between 10 and 100, and more often from about 20 to about 80, and a specific gravity of from 0.85 to about 0.88 g/cc.

The ethylene, alpha-olefin copolymers useful in the cling films of the present invention are available commercially from a variety of sources. For example, a variety of ethylene/propylene copolymers are available from Polysar Corp. (Bayer) under the general trade designation "POLYSAR." Particular examples include POLYSAR EPM 306 which is an ethylene/propylene copolymer containing 68 weight percent ethylene and 32 weight percent propylene; POLYSAR EPDM 227 is a copolymer of ethylene, propylene and 3% ENB wherein the ethylene/propylene ratio is 75/25. An example of a copolymer containing a smaller amount of ethylene is POLYSAR EPDM 345 which contains 4% ENB and the weight ratio of ethylene/propylene is 60/40. Bayer XF-004 is an experimental EPDM containing 65 weight percent of ethylene, 32% by weight of propylene and 3% by weight of norbornenediene (NB). Another group of ethylene/propylene rubbers are available from Bayer under the general trade designation "BUNA AP." In particular, BUNA AP301 is an ethylene/propylene copolymer containing 51% ethylene and 49% propylene; BUNA AP147 is a copolymer containing 4% ENB and the weight ratio of ethylene/propylene is 73/27.

Ethylene/propylene rubbers are also available from Exxon Chemical Company. One example is VISTALON 719 which has a typical ethylene content of 75%, a typical Mooney viscosity (at 127° C.) of 54, and a specific gravity of 0.87.

The polymeric cling films of the present invention also may be prepared utilizing thermoplastic elastomer materials such as block copolymers represented by the diblock structures A—B, the triblock A—B—A, the radial or coupled structures (A—B)$_n$, and combinations of these where A represents a hard thermoplastic phase or block which is non-rubbery or glassy or crystalline at room temperature but fluid at higher temperatures, and B represents a soft block which is rubbery or elastomeric at service or room temperature. These thermoplastic elastomers may comprise from about 40% to about 95% by weight of rubbery segments and from about 5% to about 60% by weight of non-rubbery segments.

The non-rubbery segments or hard blocks comprise polymers of mono- and polycyclic aromatic hydrocarbons, and more particularly vinyl-substituted aromatic hydrocarbons which may be monocyclic or bicyclic in nature. The preferred rubbery blocks or segments are polymer blocks of homopolymers or copolymers of aliphatic conjugated dienes. Rubbery materials such as polyisoprene, polybutadiene, and styrene butadiene rubbers may be used to form the rubbery block or segment. Particularly preferred rubbery segments include polydienes and saturated olefin rubbers of ethylene/butylene or ethylene/propylene copolymers. The latter rubbers may be obtained from the corresponding unsaturated polyalkylene moieties such as polybutadiene and polyisoprene by hydrogenation thereof.

The block copolymers of vinyl aromatic hydrocarbons and conjugated dienes which may be utilized include any of those which exhibit elastomeric properties. The block copolymers may be diblock, triblock, multiblock, starblock, polyblock or graftblock copolymers. Throughout this specification and claims, the terms diblock, triblock, multiblock, polyblock, and graft or grafted-block with respect to the structural features of block copolymers are to be given their normal meaning as defined in the literature such as in the Encyclopedia of Polymer Science and Engineering, Vol. 2, (1985) John Wiley & Sons, Inc., New York, pp. 325–326, and by J. E. McGrath in *Block Copolymers, Science Technology,* Dale J. Meier, Ed., Harwood Academic Publishers, 1979, at pages 1–5.

Such block copolymers may contain various ratios of conjugated dienes to vinyl aromatic hydrocarbons including those containing up to about 60% by weight of vinyl aromatic hydrocarbon. Accordingly, multi-block copolymers may be utilized which are linear or radial symmetric or asymmetric and which have structures represented by the formulae A—B, A—B—A, A—B—A—B, B—A—B, $(AB)_{0,1,2}$ . . . BA, etc., wherein A is a polymer block of a vinyl aromatic hydrocarbon or a conjugated diene/vinyl aromatic hydrocarbon tapered copolymer block, and B is a rubbery polymer block of a conjugated diene.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes which may be utilized to prepare the polymers and copolymers are those containing from 4 to about 10 carbon atoms and more generally, from 4 to 6 carbon atoms. Examples include from -1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes also may be used. The preferred conjugated dienes are isoprene and 1,3-butadiene. Examples of vinyl aromatic hydrocarbons which may be utilized to prepare the copolymers include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene, etc. The preferred vinyl aromatic hydrocarbon is styrene. Many of the above-described copolymers of conjugated dienes and vinyl aromatic compounds are commercially available. The number average molecular weight of the block copolymers, prior to hydrogenation, is from about 20,000 to about 500,000, preferably from about 40,000 to about 300,000.

The average molecular weights of the individual blocks within the copolymers may vary within certain limits. In most instances, the vinyl aromatic block will have a number average molecular weight in the order of about 2000 to about 125,000, and preferably between about 4000 and 60,000. The conjugated diene blocks either before or after hydrogenation will have number average molecular weights in the order of about 10,000 to about 450,000 and more preferably from about 35,000 to 150,000.

Also, prior to hydrogenation, the vinyl content of the conjugated diene portion generally is from about 10% to about 80%, and the vinyl content is preferably from about 25% to about 65%, particularly 35% to 55% when it is desired that the modified block copolymer exhibit rubbery elasticity. The vinyl content of the block copolymer can be measured by means of nuclear magnetic resonance.

Specific examples of diblock copolymers include styrene-butadiene, styrene-isoprene, and the hydrogenated derivatives thereof. Examples of triblock polymers include styrene-butadiene-styrene (SBS), styrene-isoprene-styrene (SIS), alpha-methylstyrene-butadiene-alpha-methylstyrene, and alpha-methylstyrene-isoprene alpha-methylstyrene. Upon hydrogenation of the SBS copolymers comprising a rubbery segment of a mixture of 1,4 and 1,2 isomers, a styrene-ethylene-butylene styrene (SEBS) block copolymer is obtained. Similarly, hydrogenation of an SIS polymer yields a styrene-ethylene propylene-styrene (SEPS) block copolymer.

The selective hydrogenation of the block copolymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or copolymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block copolymers which are carried out in a manner and to extent as to produce selectively hydrogenated copolymers having a residual unsaturation content in the polydiene block of from about 0.5% to about 20% of their original unsaturation content prior to hydrogenation.

In one embodiment, the conjugated diene portion of the block copolymer is at least 90% saturated and more often at least 95% saturated while the vinyl aromatic portion is not significantly hydrogenated. Particularly useful hydrogenated block copolymers are hydrogenated products of the block copolymers of styrene-isoprene-styrene such as a styrene-(ethylene/propylene)-styrene block polymer. When a polystyrene-polybutadiene-polystyrene block copolymer is hydrogenated, it is desirable that the 1,2-polybutadiene to 1,4-polybutadiene ratio in the polymer is from about 30:70 to about 70:30. When such a block copolymer is hydrogenated, the resulting product resembles a regular copolymer block of ethylene and 1-butene (EB). As noted above, when the conjugated diene employed as isoprene, the resulting hydrogenated product resembles a regular copolymer block of ethylene and propylene (EP). A number of selectively hydrogenated block copolymers are available commercially from Shell Chemical Company under the general trade designation "Kraton." One example is Kraton G-1652 which is a hydrogenated SBS triblock comprising about 30% by weight of styrene end blocks and a midblock which is a copolymer of ethylene and 1-butene (EB).

A lower molecular weight version of G1652 is available from Shell under the designation Kraton G1650. Kraton G1657 is a triblock copolymer which contains about 14%w styrene with polystyrene end blocks and a rubbery poly (ethylene-butene) midblock. This styrene content is lower than the styrene content in Kraton G1650 and Kraton G1652. Kraton GRP6598 is a styrene-ethylene/butylene-styrene block copolymer.

In another embodiment, the selectively hydrogenated block copolymer is of the formula

$$B_n(AB)_o A_p$$

wherein n=0 or 1;
 o is 1 to 100;
 p is 0 or 1;
 each B prior to hydrogenation is predominantly a polymerized conjugated diene hydrocarbon block having a number average molecular weight of about 20,000 to about 450,000;
 each A is predominantly a polymerized vinyl aromatic hydrocarbon block having a number average molecular weight of from about 2000 to about 115,000; the blocks of A constituting about 5% to about 95% by weight of the copolymer; and the unsaturation of the block B is less than about 10% of the original unsaturation. In other embodiments, the unsaturation of block B is reduced upon hydrogenation to less than 5% of its original value, and the average unsaturation of the hydrogenated block copolymer is reduced to less than 20% of its original value.

The polymers used in the cling films of the invention may also include functionalized polymers such as may be obtained by reacting an alpha, beta-olefinically unsaturated monocarboxylic or dicarboxylic acid reagent onto selectively hydrogenated block copolymers of vinyl aromatic hydrocarbons and conjugated dienes as described above. The reaction between the carboxylic acid reagent in the graft block copolymer can be effected in solutions or by a melt process in the presence of a free radical initiator.

The preparation of various selectively hydrogenated block copolymers of conjugated dienes and vinyl aromatic hydrocarbons which have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference. U.S. Pat. No. 4,795,782 describes and gives examples of the preparation of the grafted block copolymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy) hexane by a melt reaction in a twin screw extruder. (See Col. 8, lines 40–61.)

Examples of commercially available maleated selectively hydrogenated copolymers of styrene and butadiene include Kraton FG1901X and FG1921X from Shell, often referred to as maleated selectively hydrogenated SEBS copolymers. FG1901X contains about 2%w of maleic anhydride and 28%w of styrene. FG1921X contains about 1%w of maleic anhydride and 28%w of styrene.

Other TPEs which can be used to form the cling film layer include copolyesters which are also block copolymers with alternating hard polyalkylene terephthalate and soft polyalkylene ether segments or blocks. Thermoplastic polyurethane elastomers are block copolymers with soft segments comprising a polyester or polyether macroglycol, and hard segments which result from the reaction of lower molecular weight glycol with diisocyanate. Polyether and polyester block polyamide elastomers also can be used. The block copolymers have polyamide hard segments and either an aliphatic polyether or aliphatic polyester as soft segments.

The thermoplastic elastomers of the cling layer may also comprise mixtures of block copolymers as described above with polyolefins such as linear low density polyethylene (LLDPE) and low density polyethylene (LDPE). In some instances, the cling properties of cling films comprising the block copolymers have a tendency to increase on aging, and it becomes difficult to remove the cling film from a substrate such as glass without tearing or destroying the cling film so that it cannot be reused. This phenomenon is referred to as "age up." However, it has been discovered that the presence of a minor amount of low density polyethylene and ethylene copolymers in the mixture of the cling layer reduces or controls the cling properties of the cling layer to a desirable level both initially and over a period of time. The useful low density ethylene polymers and copolymers range in densities of from about 0.880 to about 0.940. Specific examples of commercially available useful low density ethylene-1-octene copolymers include: Dowlex 2036A with a density in the range of 0.9330 to 0.9370; Dowlex 2032PER with a density of 0.9240 to 9280; Affinity PF1140 with a density of 0.895 to 0.898; Affinity VP8770 with a density of 0.885; Attane 4402 with a density of 0.912; and Attane 4401 with a density of 0.912. All of these copolymers are available from the Dow Chemical Co. The amount of the low density polyolefin in the polymer mixture of the cling layer may range from about 5% to about 40% or more by weight and more often from about 25% to 40% by weight.

The thermoplastic elastomers of the cling layer are substantially free of added plasticizer (e.g., dioctyl phthalate) or tackifier although in some embodiments, the elastomers may contain small amounts of plasticizer such as up to about 10% or 15% by weight. By substantially free is meant the elastomers contain less than 1% by weight of added plasticizer. The thermoplastic elastomer films may, and preferably do, contain ultraviolet light absorbers, antioxidants and other light stabilizers. These additives are included in the films to prevent degradation of the films due to sunlight and to increase the useful life of the cling films. It has been observed, for example, that in addition to an objectionable change in color resulting from degradation, the degraded cling films are more difficult to remove from the substrate and cannot be generally reapplied to the substrate. Accordingly, it is preferred to include various stabilizers in the films. One useful type of stabilizer is a hindered amine light stabilizer. Hindered amine light stabilizers are described in the literature such as in U.S. Pat. No. 4,721,531, Cols. 4–9. Such hindered amine light stabilizers may, for example, be derivatives of 2,2,6,6-tetraalkyl piperidines or substituted piperizinediones. A numbered of hindered amine light stabilizers useful in the invention are available commercially such as from Ciba-Geigy Corporation under the general trade designations "Tinuvin" and "Chimassorb"; and from Cytec under the general designation "Cyasorb-UV." Specific examples of useful hindered amine light stabilizers include Tinuvin 770 which is identified as bis-(2,2,6,6-tetramethyl-4-piperidinyl)-sebacate; Tinuvin 765 which is identified as bis-(1,2,2,6,6-pentamethyl-4-piperidinyl)-sebacate; Tinuvin 144 which is bis-(1,2,2,6,6-pentamethyl-4-piperidinyl)-2-n-butyl-2-(3'5'-di-tert-butyl-4-hydroxybenzyl) malonate; Tinuvin 622 which is a polyester of succinic acid and N-beta-hydroxy ethyl-2,2,6,6-tetramethyl-4-hydroxy-piperidine; and Chimassorb 944 which is poly [6-(1,1,3,3-tetramethylbutyl)amino]-s-triazine-2,4-diyl[[2,2,6,6-tetramethyl-4-piperidyl)imino]hexamethylene (2,2,6,6-tetramethyl-4-piperidyl)imino].

The thermoplastic elastomer cling film layer of the invention also may contain at least one hindered phenolic antioxidant compound. Useful hindered phenolic antioxidant compounds are known in the art and are described in, for example, U.S. Pat. No. 4,721,531, Cols. 13–14. U.S. Pat. No. 4,721,531 is hereby incorporated by reference for its disclosure of such hindered phenolic antioxidant compounds. Any of the hindered phenolic antioxidant compounds disclosed in the '531 patent can be utilized in the cling films of the present invention. Some of the hindered phenolic antioxidant compounds are available commercially from Ciba-Geigy under the general trade designations "IRGANOX" and "Tinuvin." Specific examples include IRGANOX 1076 which is believed to be n-octadecyl-3-(3'5'-di-t-butyl-4'-hydroxyphenyl)propanoate; IRGANOX 1010 which is 2,2-bis[(3-(3,5-bis(1,1-dimethylethyl-4-hydroxyphenyl]-1-oxopropoxy]methyl]-1,3-propanediyl-3,5-bis(1,1-dimethylethyl)-4-hydroxy benzene propanoate; Tinuvin 326 which is 2-(5-chloro-2H-benzotriazol-2-yl)-6-(1,1-dimethylethyl)-4-methylphenol; and Tinuvin 328 which is 2(2'-hydroxy-3',5'-di-t-amylphenyl)benzotriazole.

The above discussion of antioxidants, light stabilizers and ultraviolet stabilizers is not intended to be limiting as other examples of hindered phenolic antioxidants and hindered amine light stabilizers can be utilized. For example, a variety of ultraviolet absorbers can be utilized and include benzotriazol derivatives, hydroxy benzophenones, esters of benzoic acids, oxalic acid, diamides, etc. The amounts of the heat light stabilizers, and the amounts of antioxidants incorporated into the films of the present invention will be an amount which will be sufficient when blended into the film to provide the desired stabilization. In general, the cling film layer (and other layers) of the invention may contain from 0.001% to about 0.5% by weight of one or more stabilizers such as antioxidants, UV stabilizers, light stabilizers, etc.

The cling film layer (and other layers such as the printable layer) of the cling films of the invention also may contain one or more slip agent in various amounts to reduce blocking when the films are wound and to reduce or control the peel force of the cling layer when applied to a solid substrate, particularly after aging. The films may contain from about 0.05% to about 1.5% by weight of a slip agent. Slip agents generally are derived from naturally occurring vegetable oils and animal fats which may be saturated of unsaturated. Examples of slip agents include amides and amide mixtures such as primary amides of erucic acid, stearic acid, oleic acid, palmitic acid, etc. Particular examples found to be useful in the present invention include Ampacet 10061 which comprises 5% of a 50:50 mixture of the primary amides of erucic and stearic acids in polyethylene, and Elvax 3170 which comprises a similar blend of the amides of erucic and stearic acids in a blend of 18% vinyl acetate resin and 82% polyethylene. These slip agents are available from DuPont. Slip agents also are available from Croda Universal, Houston Tex. Examples of slip agents available from Croda include Crodamide OR (an oleamide), Crodamide SR (a stearamide), Crodamide ER (an erucamide), and Crodamide BR (a behenamide).

The monolayer and multilayer cling films of the present invention may also contain antiblocking and/or nucleating agents. The addition of antiblocking agents to the film formulations reduces the tendency of the films to block during windup, regulates the slip and anti-static properties of the films and allows a smooth unwinding from the reels. Any of the antiblocking agents described in the prior art as useful additives for modifying the properties of polymer films and in particular, olefin polymer films, can be included in the film formulations of the present invention. Silicas with average particle sizes of about 2 microns or less can be utilized for this purpose, and only small amounts (for example, 1000 to 5000 ppm) of the fine silica are needed. Several antiblocking agents based on synthetic silica are available from A. Schuman, Inc., Akron, Ohio, under the general trade designation Polybatch®. These materials are antiblocking masterbatches and comprise free-flowing pellets comprising propylene homopolymers or copolymers and the synthetic silica. For example, Polybatch ABPP-05 comprises 5% synthetic silica in a propylene homopolymer; ABPP-10 comprises 10% synthetic silica in a propylene homopolymer; and ABPP-05SC comprises 5% synthetic silica and a random propylene copolymer. When the antiblocking agents are to be utilized in the preparation of the multilayer films of the present invention, the antiblocking agent generally is added to the skin layer formulations only.

Nucleating agents can be added to increase crystallinity and thereby increase stiffness. The nucleating agents also improve die cuttability when in the core layer. Examples of useful materials include calcium carbonate, titanium dioxide, metal particles, fibers, flame retardants, antioxidant compounds, heat stabilizers, light stabilizers, ultraviolet light stabilizers, antiblocking agents, processing aids, acid acceptors, etc.

Various nucleating agents and pigments can be incorporated into the films of the present invention. The amount of nucleating agent added should be an amount sufficient to provide the desired modification of the crystal structure while not having an adverse effect on the desired properties of the films. It is generally desired to utilize a nucleating agent to modify the crystal structure and provide a large number of considerably smaller crystals or spherulites to improve the transparency (clarity), and stiffness, and the die-cuttability of the film. Obviously, the amount of nucleating agent added to the film formulation should not have a deleterious affect on the clarity of the film. Nucleating agents which have been used heretofore for polymer films include mineral nucleating agents and organic nucleating agents. Examples of mineral nucleating agents include carbon black, silica, kaolin and talc. Among the organic nucleating agents which have been suggested as useful in polyolefin films include salts of aliphatic mono-basic or di-basic acids or aryalkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium betanaphtholate, lithium benzoate and aluminum tertiary-butyl benzoate also are useful organic nucleating agents. Substituted sorbitol derivatives such as bis (benzylidene) and bis (alkylbenzilidine) sorbitols wherein the alkyl groups contain from about 2 to about 18 carbon atoms are useful nucleating agents. More particularly, sorbitol derivatives such as 1,3,2,4-dibenzylidene sorbitol, 1,3,2,4-di-para-methylbenzylidene sorbitol, and 1,3,2,4-di-para-methylbenzylidene sorbitol are effective nucleating agents for polypropylenes. Useful nucleating agents are commercially available from a number of sources. Millad 8C-41-10, Millad 3988 and Millad 3905 are sorbitol nucleating agents available from Milliken Chemical Co.

The amounts of nucleating agent incorporated into the film formulations of the present invention generally range from about 100 to about 7000 ppm of the film. In another embodiment, the amount of nucleating agent in the range of about 250 to about 6000, or of about 500 to about 5500, of about 1000 to about 5000, or of about 1500 to about 2500 ppm.

The following examples illustrate thermoplastic elastomer formulations useful in preparing the cling film layers of the cling films of the present invention. Unless otherwise indicated in the following examples and elsewhere in the specification and claims, all parts and percentages are by weight, temperatures are in degrees Centigrade, and pressures are at or near atmospheric. In the following examples, UV Package No. 1 comprises equal portions of a masterbatch of 10% Tinuvin 770 in low density polyethylene (LDPE) and a masterbatch of 10% Tinuvin 326 in LDPE. UV Package No. 2 comprises equal portions of a masterbatch of 10% Chimassorb 944 in LDPE and a masterbatch of 10% Tinuvin 328 in LDPE.

ink-imprintable surface which provides a good quality, stable print. Illustrative thermoplastics which may be used alone or in combination include polyolefins such as polyethylene, polypropylene and polybutylene, thermoplastic polyesters, polyamides such as nylon, polysulfone, acrylic polymers such as polyethylene methacrylic acid, polyethylene ethyl acrylate, and polyethylene methyl acrylate, polystyrene, polyurethane, polycarbonate, cellulosics, polyacrylonitriles, ethylene-vinyl acetate copolymers (EVA), etc. The choice of material for the first layer is determined by the properties desired of this layer such as improved printability, weatherability, etc.

In one embodiment, ethylene vinyl acetate copolymer (EVA) and polyolefin blends with EVA are preferred materials for the first layer. For good printability, the EVA content of the blend of the first layer should be above 10% by weight, preferably between about 20% and 80%, and most preferably from about 30% to about 70%. While the EVA content can be slightly higher, the polyolefin is the less costly component. In one embodiment the thermoplastic elastomer of the first layer is EVA. The vinyl acetate content of the EVA copolymers may range from about 5% to about 25%.

The olefin polymer of the polyolefin-EVA blends may be polymers and copolymers of alpha-olefins such as ethylene,

TABLE I

Cling Layer Formulations

| | Example | | | | | | | | |
|---|---|---|---|---|---|---|---|---|---|
| | A | B | C | D | E | F | G | H | I |
| Kraton G-1657 | 99.7 | — | 99.7 | — | 100 | — | — | — | — |
| Polysar EP-306P | — | 99.7 | — | 99.7 | — | 100 | — | — | — |
| Bayer XF-004 | — | — | — | — | — | — | 99.7 | 100 | 99.7 |
| UV Package 1 | 0.3 | 0.3 | — | — | — | — | — | — | 0.3 |
| UV Package 2 | — | — | 0.3 | 0.3 | — | — | 0.3 | — | — |
| Milliad 3988 | — | *1 | * | * | * | * | * | * | ** |

[1]2000 ppm

In a second embodiment, the cling films of the present invention comprise at least two layers comprising (A) a first layer of at least one thermoplastic polymer film having an ink-imprinted upper surface and a smooth upper surface; and (B) a second layer which is a polymeric cling film having an upper surface and a lower surface and comprising at least one non-vinyl thermoplastic elastomer wherein the upper surface of the second layer is in contact with an adhered to lower surface of the first layer. The upper surface of the first layer is smooth. In one embodiment the upper surface is characterized as having a surface smoothness of less than about 30 Ra and more often in the range of about 0 to about 20 or 25 Ra. Ra as used in this application and claims is defined as the arithmatic average height of the micro peaks to the center of the center line (in microinches) of a particular surface as measured by a profilometer. The smooth surface is not matte or embossed. The multilayer cling films generally are prepared by coextrusion of two or more charges by techniques well known to those skilled in the art. The coextrusion procedure results in the heat bonding or welding of the two or more layers and the formation of an integral laminate.

The thermoplastic polymers used to form the film of the first layer (A) may comprise a wide range of polymers, copolymers, interpolymers and blends thereof selected to meet the requirements of the end use of the application. For example, the thermoplastic polymer is selected to provide an propylene. Examples of such polymers and copolymers include polyethylene, polypropylene, copolymers of ethylene and propylene, blends of polyethylene and/or polypropylene with ethylene-propylene copolymers, etc.

The thermoplastic elastomers which can be utilized to form the cling layer (second layer) of the second embodiment may be any of the various thermoplastic elastomers described above with regard to the first embodiment. Thus, the thermoplastic elastomers may be copolymer rubbers of ethylene and an alpha-olefin containing about 3–18 carbon atoms and, optionally, other polymerizable monomers as described above. Alternatively, the thermoplastic elastomers comprise block copolymers and mixtures of block copolymers and polyolefins (e.g., LLDPE and LDPE) as described above.

The cling films comprising one layer as described above can be prepared by extrusion of a charge through an extrusion die, and the preparation of films comprising two or more layers can be prepared by coextrusion of two or more charges through an extrusion die. The extruded film is cast on cooling rolls and recovered. Multiple layer films can also be formed by extrusion coating whereby a substrate material is contacted with the hot molten polymer as the polymer exists the die. For example, an already formed polypropylene film may be extrusion coated with an EVA-olefin blend as the latter is extruded through the die. Multiple layer films may also be formed by combining two or more single layer films prepared as described above.

In general, the components for each of the layers to be extruded or coextruded are combined in a blender prior to extrusion to provide a uniform mixture. The charges are then extruded, and in some instances, hot stretched to form an oriented film. Following extrusion and the optional hot stretching and annealing, the film can be cut to the desired dimensions. The upper surface of the film of the first layer is a smooth surface (less than about 30 Ra) which can be ink-imprinted prior to or after cutting by techniques known to those skilled in the art. The upper surface of the film of the first layer is not embossed.

In a third embodiment of the invention, the cling films of the present invention comprise a coextrudate with at least three layers including a core and skin layers on either side of the core. The skin layer on the face side of the coextrudate is selected to provide the desired properties such as ink-imprintability, weatherability, etc., and the upper surface of the skin layer on the face side of the coextrudate is smooth having an Ra of less than about 30 and more often from 0 to about 25 or from 0 to about 20. This surface also is not matte or embossed. This ink-imprintable skin layer may comprise (1) ethylene-vinyl acetate copolymers (EVA) or (2) blends of polymers and copolymers of ethylene and propylene, and EVA. The skin layer on the inner side of the coextrudate opposite the face side comprises a layer of cling film as described above. The material used to form the core is selected to provide the desired properties to the composite construction such as, for example, stiffness and opacity. The core may comprise polymers and copolymers of ethylene/propylene, etc., and blends of polyethylene, polypropylene, or mixtures thereof with ethylene vinyl acetate copolymer such as used in the cling layer or the printable layer. Presently preferred materials for the core comprise blends of (1) an alpha olefin polymer or copolymer such as polypropylene or copolymers of propylene and ethylene, and (2) EVA. The olefin polymers and/or the weight ratios will be different for the skin and core. However, olefin-EVA blends used in the core are preferably polypropylene which has a higher melting point than polyethylene so and better resists deformation if the film is subjected to increase in temperature, for example, when UV-curable inks are used for printing. Another useful material for the core is polyethylene of low, medium or high density between about 0.882 and 0.965. Elvax CE9619 is an ethylene vinyl acetate copolymer resin concentrate that is useful in the core of the cling films of this invention. Elvax CE9619 comprises a mixture of 73% ethylene vinyl acetate copolymer, 7% of a slip additive and 20% of an antiblock additive. This resin concentrate is available from DuPont. Another resin useful in the core is CC Resin 6D81, form Shell which is a random copolymer of ethylene and propylene containing 5.5% by weight of ethylene. It has a melt index of 2.5–3.0.

In one embodiment, the core layer includes a nucleating agent.

It has been discovered that the presence of the nucleating agent improves die cuttability.

Inorganic fillers may be included in the core to provide opaque films. Useful fillers include calcium carbonate, titanium dioxide and blends thereof. For contact-clear film applications, the preferred core is EVA-olefin blend without filler. For opaque film applications, the preferred core layer is the same olefin-EVA blend filled with a mixture of calcium carbonate and titanium dioxide.

While EVA is presently preferred as a soft polar additive in the olefin-EVA blends, other soft polar additives can be utilized in combination with olefins to form the core or the face skin layer. Examples of alternative soft polar additives are ethylene methyl acrylate (EMA) and acrylonitrile butadiene rubber which are also random copolymers of an olefin and a more polar moiety that are immiscible in and softer than the olefinic base material of the olefin blend.

The inner skin, as mentioned above, is the cling layer and provides the desired cling properties to the multilayer film. Any of the thermoplastic elastomer films described above as useful cling films can be used as the cling layer in this embodiment.

In addition to the above layers, the cling films of the invention may also comprise an additional layer in contact with the cling side (exposed side) of the cling layer. This additional layer may comprise a slip sheet or liner to protect the cling side of the cling layer from the elements including dirt and dust which would negatively affect the cling properties of the film. The slip sheet or liner may also serve to prevent premature blocking of the cling side when the film is wound in roll form or inadvertently contacts another surface or cling film. The slip sheets or liners may comprise various materials so long as the side contacting the cling surface is smooth or polished. Polycoated paper (coated with HD, MD or LD polyethylene) is an example of a slip sheet or liner that is useful.

The following Examples 1–56 illustrate the three-layer cling films of the present invention. In these examples, the antioxidant (AO) package comprises equal weight portions of a masterbatch of 10% by weight of Irganox 1010 in LDPE and a masterbatch of 10% Irganox 1076 in LDPE. The calcium carbonate is added as a concentrate of 40% calcium carbonate in homopolypropylene, and the titanium dioxide is added as a concentrate of 50% $TiO_2$ in homopolypropylene. Three charges were prepared from the formulations set forth in Tables II–X and coextruded to form three-layer laminates wherein the print skin and the cling skin are about 1 mil in thickness and the core is about 3 mils thick. The random polypropylene is a random propylene-ethylene copolymer containing about 3.2% ethylene. In Tables II to X the amounts are in parts by weight.

TABLE II

Three-Layered Films (Clear)

| | Example | | | | | |
|---|---|---|---|---|---|---|
| | 1 | 2 | 3 | 4 | 5 | 6 |
| Print Skin | | | | | | |
| Polypropylene homopolymer | 50 | 50 | 50 | 50 | 50 | 50 |
| Quantum EVA (18% VA) | 49.7 | 49.7 | 49.7 | 49.7 | 49.7 | 49.7 |
| UV Package 1 | 0.3 | 0.3 | — | — | — | — |
| UV Package 2 | — | — | 0.3 | 0.3 | 0.3 | 0.3 |
| Core | | | | | | |
| Quantum EVA (18% VA) | 35 | 35 | 35 | 35 | 35 | 35 |
| Random Polypropylene | 65 | 65 | 65 | 65 | 65 | 65 |
| UV Package 1 | 0.1 | 0.1 | 0.1 | 0.1 | 0.1 | 0.1 |
| AO Package | 0.1 | 0.1 | 0.1 | 0.1 | 0.1 | 0.1 |
| Cling Skin | | | | | | |
| Kraton G-1657 | 99.7 | — | 99.7 | — | 100 | — |
| Polysar EP-306P | — | 99.7 | — | 99.7 | — | 100 |
| UV Package 1 | 0.3 | 0.3 | — | — | — | — |
| UV Package 2 | — | — | 0.3 | 0.3 | — | — |

TABLE III

Three-Layered Films (Opaque)

| | Example | | | | | |
|---|---|---|---|---|---|---|
| | 7 | 8 | 9 | 10 | 11 | 12 |
| Print Skin | | | | | | |
| Polypropylene homopolymer | 50 | 50 | 50 | 50 | 50 | 50 |
| Quantum EVA (18% VA) | 50 | 49.7 | 49.7 | 49.7 | 49.7 | 50 |
| UV Package 1 | — | 0.3 | — | — | 0.3 | — |
| UV Package 2 | — | — | 0.3 | 0.3 | — | — |
| Core | | | | | | |
| Polypropylene homopolymer | 15 | 15 | 15 | 15 | 15 | 15 |
| Quantum EVA (18% VA) | 19.8 | 19.8 | 19.8 | 19.8 | 19.8 | 19.8 |
| CaCO$_3$ | 50 | 50 | 50 | 50 | 50 | 50 |
| TiO$_2$ | 15 | 15 | 15 | 15 | 15 | 15 |
| UV Package 1 | 0.1 | 0.1 | 0.1 | 0.1 | 0.1 | 0.1 |
| AO Package | 0.1 | 0.1 | 0.1 | 0.1 | 0.1 | 0.1 |
| Cling Skin | | | | | | |
| Kraton G-1657 | — | — | — | 99.7 | 99.7 | 100 |
| Polysar EP-306P | 100 | 99.7 | 99.7 | — | — | — |
| UV Package 1 | — | 0.3 | — | — | 0.3 | — |
| UV Package 2 | — | — | 0.3 | 0.3 | — | — |

TABLE IV

Three-Layered Films (Clear)

| | Example | | | | |
|---|---|---|---|---|---|
| | 13 | 14 | 15 | 16 | 17 |
| Print Skin | | | | | |
| Polypropylene homopolymer | 50 | 50 | 50 | 50 | 50 |
| Quantum EVA (18% VA) | 49.7 | 49.7 | 50 | 49.7 | 49.7 |
| UV Package 1 | 0.3 | 0.3 | — | 0.3 | — |
| UV Package 2 | — | — | — | — | 0.3 |
| Core | | | | | |
| Polypropylene homopolymer | 99.8 | 69.8 | — | — | — |
| Quantum EVA (18% VA) | — | — | 35 | 35 | 35 |
| Random Polypropylene | — | — | 65 | 65 | 65 |
| UV Package 1 | 0.1 | 0.1 | 0.1 | 0.1 | 0.1 |
| AO Package | 0.1 | 0.1 | 0.1 | 0.1 | 0.1 |
| Nylon | — | 30 | — | — | — |

TABLE IV-continued

Three-Layered Films (Clear)

| | Example | | | | |
|---|---|---|---|---|---|
| | 13 | 14 | 15 | 16 | 17 |
| Cling Skin | | | | | |
| Polysar EP-306P | 99.7 | — | — | — | — |
| Bayer XF-004 | — | 99.7 | 100 | 99.7 | 99.7 |
| UV Package 1 | 0.3 | — | — | 0.3 | — |
| UV Package 2 | — | 0.3 | — | — | 0.3 |

TABLE V

Three-Layered Films (Opaque)

| | Example | | | |
|---|---|---|---|---|
| | 18 | 19 | 20 | 21 |
| Print Skin | | | | |
| Polypropylene homopolymer | 50 | 50 | 50 | 50 |
| Quantum EVA (18% VA) | 50 | 49.7 | 49.7 | 49.7 |
| UV Package 1 | — | 0.3 | — | — |
| UV Package 2 | — | — | 0.3 | 0.3 |
| Core | | | | |
| Polypropylene | 15 | 15 | 15 | 15 |
| Quantum EVA (18% VA) | 19.8 | 19.8 | 19.8 | 15 |
| Bayer XF-004 | — | — | — | 5 |
| CaCO$_3$ | 50 | 50 | 50 | 49.8 |
| TiO$_2$ | 15 | 15 | 15 | 15 |
| UV Package 1 | 0.1 | 0.1 | 0.1 | 0.1 |
| AO Package | 0.1 | 0.1 | 0.1 | 0.1 |
| Cling Skin | | | | |
| Kraton G-1657 | — | — | — | 99.7 |
| Bayer XF-004 | 100 | 99.7 | 99.7 | — |
| UV Package 1 | — | 0.3 | — | — |
| UV Package 2 | — | — | 0.3 | 0.3 |

TABLE VI

Three-Layered Films (Opaque)

| | Example | | | | | | | | |
|---|---|---|---|---|---|---|---|---|---|
| | 22 | 23 | 24 | 25 | 26 | 27 | 28 | 29 | 30 |
| Print Skin | | | | | | | | | |
| Polypropylene homopolymer | 50 | 50 | 50 | 50 | 50 | 50 | 50 | 48 | 49 |
| Quantum EVA | 50 | 50 | 50 | 50 | 50 | 50 | 50 | 50 | 50 |

TABLE VI-continued

Three-Layered Films (Opaque)

| | Example | | | | | | | | |
|---|---|---|---|---|---|---|---|---|---|
| | 22 | 23 | 24 | 25 | 26 | 27 | 28 | 29 | 30 |
| (18% VA) | | | | | | | | | |
| UV Package 2 | 0.3 | 0.3 | 0.3 | 0.3 | 0.3 | 0.3 | 0.3 | 0.3 | 0.3 |
| Slip Additive | — | — | — | — | — | — | — | — | 21 |
| Core | | | | | | | | | |
| Polypropylene homopolymer | 15 | 15 | 15 | 15 | 15 | 15 | 15 | 15 | 15 |
| Quantum EVA (18% VA) | 19.8 | 19.8 | 19.8 | 19.8 | 19.8 | 19.8 | 19.8 | 19.8 | 19.8 |
| $CaCO_3$ | 50 | 50 | 50 | 50 | 50 | 50 | 50 | 50 | 50 |
| $TiO_2$ | 15 | 15 | 15 | 15 | 15 | 15 | 15 | 15 | 15 |
| UV Package 2 | 0.1 | 0.1 | 0.1 | 0.1 | 0.1 | 0.1 | 0.1 | 0.1 | 0.1 |
| AO Package | 0.1 | 0.1 | 0.1 | 0.1 | 0.1 | 0.1 | 0.1 | 0.1 | 0.1 |
| Cling Skin | | | | | | | | | |
| Dow 2032 | 40 | 50 | — | — | 60 | 70 | 80 | 43 | 45 |
| Dow 2036A | — | — | — | 30 | 60 | — | — | — | — |
| Kraton G-1657 | 60 | 50 | 70 | 40 | 40 | 30 | 20 | 55 | 54.2 |
| UV Package 2 | 0.3 | 0.3 | 0.3 | 0.3 | 0.3 | 0.3 | 0.3 | 0.3 | 0.3 |
| Slip Additive | — | — | — | — | — | — | — | — | 20.5 |

TABLE VII

Three-Layered Films

| | Example | | | | | | | |
|---|---|---|---|---|---|---|---|---|
| | 31 | 32 | 33 | 34 | 35 | 36 | 37 | 38 |
| Print Skin | | | | | | | | |
| Polypropylene homopolymer | — | — | 50 | 50 | 50 | — | 50 | — |
| Quantum EVA (18% VA) | — | — | 50 | 50 | 50 | — | 50 | — |
| CC Resin 6D81 | 99.7 | 99.7 | — | — | — | 99.7 | — | 99.7 |
| UV Package 2 | 0.3 | 0.3 | 0.3 | 0.3 | 0.3 | 0.3 | 0.3 | 0.3 |
| Core | | | | | | | | |
| Polypropylene homopolymer | — | — | 15 | 15 | 15 | — | — | — |
| Quantum EVA (18% VA) | — | — | 19.8 | 19.8 | 19.8 | — | — | — |
| Kraton G-1652 | 10.0 | 15.0 | — | — | — | 10 | 10 | 10 |
| CC Resin 6D81 | 89.9 | 84.9 | — | — | — | 89.9 | 89.9 | 89.9 |
| $CaCO_3$ | — | — | 50 | 50 | 50 | — | — | — |
| $TiO_2$ | — | — | 15 | 15 | 15 | — | — | — |
| UV Package 2 | 0.1 | 0.1 | 0.1 | 0.1 | 0.1 | 0.1 | 0.1 | 0.1 |
| AO Package | — | — | 0.1 | 0.1 | 0.1 | — | — | — |
| Cling Skin | | | | | | | | |
| Dow 2032 | — | — | — | — | 30 | 30 | — | 30 |
| Kraton G-1657 | 99.7 | 49.7 | 50 | 70 | 70 | — | 70 | 70 |
| Kraton GRP-6598 | — | — | 50 | — | — | 70 | 30 | — |
| Kraton G-1652 | — | 50 | — | 30 | — | — | — | — |
| UV Package 2 | 0.3 | 0.3 | 0.3 | 0.3 | 0.3 | 0.3 | 0.3 | 0.3 |

TABLE VIII

Three-Layered Films

| | Example | | | | | | | |
|---|---|---|---|---|---|---|---|---|
| | 39 | 40 | 41 | 42 | 43 | 44 | 45 | 46 |
| Print Skin | | | | | | | | |
| Quantum EVA (9% VA) | 98.7 | 98.7 | 98.7 | 98.7 | 98.7 | 98.7 | 98.7 | 98.7 |
| UV Package 2 | 0.3 | 0.3 | 0.3 | 0.3 | 0.3 | 0.3 | 0.3 | 0.3 |
| DuPont CE9619 | 1.0 | 1.0 | 1.0 | 1.0 | 1.0 | 1.0 | 1.0 | 1.0 |
| Core | | | | | | | | |
| Kraton G1657 | 5 | 5 | 5 | 5 | 5 | 5 | 5 | 5 |
| Resin 6D81 | 95.5 | 95.5 | 95.5 | 95.5 | 95.5 | 95.5 | 95.5 | 95.5 |
| UV Package 2 | 0.1 | 0.1 | 0.1 | 0.1 | 0.1 | 0.1 | 0.1 | 0.1 |
| Cling Skin | | | | | | | | |
| Kraton G1657 | 70 | 60 | 60 | 70 | 60 | 60 | 70 | 60 |
| UV Package 2 | 0.3 | 0.3 | 0.3 | 0.3 | 0.3 | 0.3 | 0.3 | 0.3 |
| DuPont CE9619 | 0.5 | 0.5 | — | 0.5 | 0.5 | — | 0.5 | 0.5 |
| VP8770 | 30 | 40 | 40 | — | — | — | — | — |
| Attane 4401 | — | — | — | 30 | 40 | 40 | — | — |
| Attane 4402 | — | — | — | — | — | — | 30 | 40 |

TABLE IX

Three-Layered Films

| | Example | | | |
|---|---|---|---|---|
| | 47 | 48 | 49 | 50 |
| Print Skin | | | | |
| Quantum EVA (9% VA) | 98.7 | 98.7 | 98.7 | 98.7 |
| UV Package 2 | 0.3 | 0.3 | 0.3 | 0.3 |
| DuPont CE9619 | 1.0 | 1.0 | 1.0 | 1.0 |
| Core | | | | |
| Kraton G1657 | 5 | 5 | 5 | 5 |
| Resin 6D81 | 95.5 | 95.5 | 95.5 | 95.5 |
| UV Package 2 | 0.1 | 0.1 | 0.1 | 0.1 |
| Cling Skin | | | | |
| Kraton G1657 | 60 | 70 | 60 | 60 |
| UV Package 2 | 0.3 | 0.3 | 0.3 | 0.3 |
| DuPont CE9619 | — | 0.5 | 0.5 | — |
| Attane 4402 | 40 | — | — | — |
| Attane 4404 | — | 30 | 40 | 40 |

TABLE X

Three-Layered Films

| | Example | | | | | |
|---|---|---|---|---|---|---|
| | 51 | 52 | 53 | 54 | 55 | 56 |
| Print Skin | | | | | | |
| Quantum EVA (9% VA) | 98.7 | 98.7 | 98.7 | 98.7 | 98.7 | 98.7 |
| UV Package 2 | 0.3 | 0.3 | 0.3 | 0.3 | 0.3 | 0.3 |
| DuPont CE9619 | 1.0 | 1.0 | 1.0 | 1.0 | 1.0 | 1.0 |
| Core | | | | | | |
| Kraton G1657 | 5 | 5 | 5 | 5 | 5 | 5 |
| Resin 6D81 | 95.5 | 95.5 | 95.5 | 95.5 | 95.5 | 95.5 |
| UV Package2 | 0.1 | 0.1 | 0.1 | 0.1 | 0.1 | 0.1 |
| Cling Skin | | | | | | |
| Kraton G1657 | 70 | 60 | 50 | 70 | 60 | 50 |
| UV Package 2 | 0.3 | 0.3 | 0.3 | 0.3 | 0.3 | 0.3 |
| DuPont CE9619 | 0.5 | 0.5 | 0.5 | 0.5 | 0.5 | 0.5 |
| Dow PF1140 | 30 | 40 | 50 | — | — | — |
| Quantum EVA (18% EVA) | — | — | — | 30 | 40 | 50 |

EXAMPLES 57–112

The above examples 1-56 are repeated except for the addition of 2000 ppm of Millad 3988 to the core layer.

The upper surface of the first layer of the multilayer cling films, and the upper surface of the monolayer cling films of the invention may be imprinted by techniques well known to those skilled in the art. For example, the printable layer can be imprinted by screen printing, offset lithography, flexographic printing, UV letter press, thermal transfer, etc. One of the advantages of the multilayer films comprising two or more layers is that the polymer used to form the upper, printable layer can be selected to provide good printability and the polymer does not have to have cling properties. In the mono-layer films of the invention, the polymer of the film must provide a film which is ink-imprintable and has cling properties. These two requirements reduce the number of available polymers which can be used.

The cling films of the present invention may be applied and reapplied to smooth substrates at ambient temperatures, and the films adhere to substrates having a smooth surface or light matte surfaces, particularly to hard surfaces such as metal, painted metal, plastics, glass, gloss paper, glazed stoneware, etc. In one embodiment, glass is a preferred substrate. The cling films of the present invention are capable of adhering to solid substrates having a smooth surface without the use of added adhesive materials. Thus, the cling film subsequently can be readily removed from the substrate, and no residue is left on the substrate. The removed cling film can be reapplied to the same or a different substrate over and over again.

In one embodiment, the cling films of the present invention exhibit desirable functional peel forces, and these peel forces may be greater than exhibited by PVC cling films. The peel force is defined as the amount of force necessary to remove the cling film after the film has been applied to a substrate such as glass. It is desirable that the cling film has at least a minimum peel force whereby the film adheres to the substrate for a desired period of time and the film is not too easily removed (e.g., by accident). The 180° peel force can be measured by utilizing the following peel test which is a modification of PSTC Test Methods for Pressure Sensitive Tapes (Eighth Edition) PSTC-1, appendages A and B (Parts 2.5 and 2.6). Cling film Samples (1" by 8") are prepared and conditioned in the lab for 24 hours. The conditioned samples are then applied to glass by hand and then by using one cycle of a roll down machine comprising a rubber covered steel roller. No air bubbles should be evident. The samples are allowed to dwell on the glass for various periods at ambient laboratory conditions or under more severe conditions to simulate longer term weather conditions. For example, some samples may be placed in an oven heated to about 140° F. for a period of time before the peel force is determined. Other samples may be placed in test units and subjected to Xenon Arc for a period of time to accelerate the affect of weathering. The release force is determined using a constant rate of extension type of Instron Tensile Tester. At the end of the conditioning, the bottom of the glass panel is inserted into the lower grip of the tensile tester. The crosshead should be positioned so that the upper grip (jaw) is approximately five inches from the lower grip. A portion of the cling film is peeled back and inserted into the upper grip. The recording device on the Instron is turned on, and the crosshead is activated. The average peel adhesion value (peel force) is recorded to the nearest chart subdivision. The values obtained during the peeling of at least the first and last one-half inch of sample from the glass panel. If using a recording chart, the average peel force can be obtained by drawing a line through the saw-toothed pattern so that "teeth" of equal areas are above and below the line. The average peel force in grams is calculated from the average peel force value obtained from the graph depending on whether the Instron used a 500 g or 100 g load cell.

The peel force of some of the films described in the above examples when applied to glass has been measured after aging at room temperature, in a 140° F. oven, or in a Xenon Arc Unit using the above-described procedures. The results are summarized in the following Tables.

TABLE XI

180° Peel Force From Glass
(Aging: 3 weeks at room temperature)

| Cling Film Example | Peel Force (gms) | Comments |
|---|---|---|
| 7 | 40 | no degradation of film |
| 8 | 14 | no degradation of film |
| 9 | 28 | no degradation of film |
| 10 | >300 | no degradation of film, erratic |

TABLE XI-continued

180° Peel Force From Glass
(Aging: 3 weeks at room temperature)

| Cling Film Example | Peel Force (gms) | Comments |
|---|---|---|
| 11 | >500 | no degradation of film, out of scale |
| 12 | 250 | no degradation of film |

TABLE XII

180° Peel Force From Glass
(Aging: Xenon Arc Unit-88 Hours)

| Cling Film Example | Peel Force (gms) | Comments |
|---|---|---|
| 16 | 1220* | some degradation of film |
| 18 | 1945 | tight release |
| 19 | 1808 | tight release-no degradation |
| 20 | 125 | hit a dead spot |

*average of two samples

TABLE XIII

180° Peel Force From Glass
(Aging: Xenon Arc Unit-306 Hours)

| Cling Film Example | Peel Force (gms) | Comments |
|---|---|---|
| 1 | 950* | no degradation of film |
| 2 | 1356* | no degradation of film |
| 3 | 904 | no degradation of film |
| 4 | 1605* | no degradation of film |
| 6 | 1536 | no degradation of film |

*average of two samples

TABLE XIV

180° Peel Force From Glass
(Aging: 72 Hours)
Peel Force (gms)

| Cling Film Example | Room Temperature | Oven at 140° F. | Xenon Arc |
|---|---|---|---|
| Control White[1] | 12 | 19 | 21.5 |
| Control Clear[2] | 16 | 20 | 26 |
| Example 35 | 9 | 408 | 2585 |
| Example 38 | 10 | 250 | 726 |

*Chart speed 2"/min; Crosshead speed 12"/min.
[1]A white plasticized cling vinyl film from Flexcon, Spencer, MA.
[2]A clear plasticized cling vinyl film from Flexcon, Spencer, MA.

TABLE XV

180° Peel Force From Glass
(Aging: 72 Hours)
Peel Force (gms)

| Cling Film Example | Room Temperature | Oven at 140° F. |
|---|---|---|
| 51 | 73 | 168 |
| 52 | 38 | 228 |
| 53 | 6 | 148 |
| 54 | 2 | 44 |

TABLE XV-continued

180° Peel Force From Glass
(Aging: 72 Hours)
Peel Force (gms)

| Cling Film Example | Room Temperature | Oven at 140° F. |
|---|---|---|
| 55 | 2 | 328 |
| 56 | 4 | 405 |

As noted above, another characteristic of the cling films of the invention is the presence of two smooth surfaces. If the cling film is a single layer, both surfaces of the single layer are smooth and not embossed. If the cling film comprises two or more layers, the top exposed surface (the printed layer) and the bottom exposed surface (the cling layer) are smooth and not embossed. The cling films may be wound upon themselves without blocking, and slip additives may be included in the top and bottom layers to further reduce any tendency of the surfaces to block when wound. The smooth surfaces generally are characterized as having a surface smoothness of less than about 30 Ra. The surface smoothness is measured using a profilometer. The surface smoothness of the printable side of the print layer and the exposed surface of the cling layer (cling side) of several cling films of this invention have been determined and the results are shown in Table XVI.

TABLE XVI

Smoothness Testing

| Cling Film Example | Average Ra (Adhesive Side) (Microinch) | Average Ra (Print Side) (Microinch) |
|---|---|---|
| Control White[1] | 10.20 | 10.00 |
| Control Clear[2] | 8.60 | 8.75 |
| Example 22 | 17.80 | 14.06 |
| Example 23 | 15.50 | 11.30 |
| Example 24 | 18.00 | 14.82 |
| Example 35 | 18.30 | 18.18 |
| Example 38 | 29.40 | 24.42 |

[1]Flexmark CV-600 is a white plasticized cling vinyl film from Flexcon, Spencer Mass.
[2]Flexmark CV-800 is a clear plasticized cling vinyl film from Flexcon, Spencer Mass.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An extruded ink-imprinted polymeric cling film of at least one layer, for use in combination with a substrate having a smooth surface, comprising a non-polyvinyl chloride flexible polymer cling film which has two smooth surfaces, is substantially free of added plasticizer and provides a 180° peel force after application to glass and aging in a 140° F. oven for 72 hours of from about 30 to about 2500 gms, wherein the cling film has a nucleating agent, and wherein the smooth surfaces have a surface smoothness in the range of from about 0 to about 30 Ra.

2. The polymeric cling film of claim 1 wherein the polymer is a thermoplastic elastomer.

3. The polymeric cling film of claim 1 having a thickness of from about 1 mil up to about 50 mils.

4. The polymeric cling film of claim 1 wherein the 180° peel force is from about 30 to about 200 gms.

5. A coextruded ink-imprinted and reusable multilayer cling film of at least two layers which can cling to substrates having a smooth surface without the use of an adhesive material comprising
   (A) a first layer of at least one thermoplastic polymer film having an upper smooth surface and a lower surface, wherein the upper surface is ink-imprinted; and
   (B) a second layer which is a polymeric cling film having an upper surface and a lower smooth surface and comprising at least one non-polyvinyl chloride thermoplastic polymer wherein the upper surface of the second layer is in contact with and adhered to the lower surface of the first layer, wherein the cling film has a nucleating agent, and the smooth surfaces have a surface smoothness in the range of from about 0 to about 30 Ra.

6. The multilayer cling film of claim 5 also comprising a fourth layer of a releasable carrier or film which is in contact with and removably adhered to the lower surface of the second layer.

7. The multilayer cling film of claim 5 wherein the second layer is substantially free of added plasticizer.

8. The multilayer cling film of claim 5 wherein the second layer is substantially free of added tackifier.

9. The multilayer cling film of claim 5 wherein the thermoplastic polymer of the first layer is a polyethylene, a polypropylene or a copolymer comprising ethylene and an alpha-olefin containing from 3 to about 18 carbon atoms.

10. The multilayer cling film of claim 5 wherein the polymer of the second layer comprises a block copolymer of molecules having rubbery segments and thermodynamically incompatible non-rubbery segments.

11. The multilayer film of claim 10 wherein the non-rubbery segments comprise polymer blocks of vinyl-substituted aromatic hydrocarbons.

12. The multilayer cling film of claim 10 wherein the rubbery segments are olefin rubbers derived from ethylene/butylene or ethylene/propylene copolymers.

13. The multilayer cling film of claim 5 wherein the thermoplastic polymers of the second layer are selected from the group consisting of polyethylene, polypropylene, copolymers of ethylene and at least one alpha-olefin containing from 3 to about 20 carbon atoms, styrene-butadiene-styrene copolymers, styrene-ethylene-butylene-styrene copolymers, styrene-isoprene-styrene copolymers, and styrene-ethylene-propylene-styrene copolymers.

14. The multilayer cling film of claim 5 wherein the second layer comprises a polyethylene film.

15. The multilayer cling film of claim 5 wherein the second layer comprises an ethylene-propylene copolymer film.

16. The multilayer cling film of claim 5 wherein the second layer also comprises at least one additive selected from the group consisting of antioxidants, ultraviolet stabilizers and mixtures thereof.

17. An article comprising a substrate having a smooth surface and an ink-imprinted multilayer cling film of claim 5 affixed to the substrate by contact of the lower surface of the second layer with a surface of the substrate whereby the cling film is removably adhered to the substrate without added adhesive.

18. The article of claim 17 wherein the substrate is glass, plastic, metal or painted metal.

19. The article of claim 17 wherein the substrate is glass.

20. A coextruded ink-imprinted and reusable multilayer cling film sign of at least three layers which can cling to glass having a rigid smooth surface without the use of an adhesive material comprising:

(A) a first layer of at least one thermoplastic polymer film having an upper smooth surface and a lower surface, wherein the upper surface is ink-imprinted;

(B) a second layer of a reinforcing polymer film containing a nucleating agent and having an upper surface and a lower surface wherein the upper surface is in contact with and adhered to the lower surface of the first layer; and (C) a third layer which is a polymeric cling film having an upper surface and a lower smooth surface and comprising at least one non-polyvinyl chloride thermoplastic polymer or copolymer wherein the upper surface of the third layer is in contact with and adhered to the lower surface of the second layer, wherein the smooth surfaces have a surface smoothness of from about 0 to about 30 Ra.

21. The multilayer cling film of claim 20 wherein the film of the first layer comprises a blend of ethylene vinyl acetate copolymer and an alpha-olefin polymer.

22. The multilayer cling film of claim 20 wherein the thickness of the second layer is greater than the combined thickness of the first and third layers.

23. The multilayer cling film of claim 20 wherein the second layer comprises a film of a polyolefin or a blend of an alpha-olefin and an ethylene vinyl acetate copolymer.

24. The multilayer cling film of claim 20 wherein the thermoplastic polymer or copolymer of the third layer comprises a polyolefin rubber or a hydrogenated block copolymer of a vinyl-substituted aromatic hydrocarbon and a diene.

25. The multilayer cling film of claim 24 wherein the diene comprises butadiene or isoprene.

26. The multilayer cling film of claim 20 wherein the thermoplastic polymer or copolymer of the third layer is a polyolefin rubber.

27. The multilayer cling film of claim 20 wherein the thermoplastic polymer or copolymer of the third layer is a polyethylene film.

28. The multilayer cling film of claim 20 wherein the polymer or copolymer of the third layer is an ethylene propylene copolymer.

29. The multilayer cling film of claim 20 also comprising a fourth layer of a releasable carrier or film which is in contact with and removably adhered to the lower surface of the third layer.

30. An article comprising a substrate having a smooth surface and an ink-imprinted multilayer cling film of claim 21 affixed to the substrate by contact of the lower surface of the third layer with a surface of the substrate whereby the cling film is removably adhered to the substrate without added adhesive.

31. The article of claim 30 wherein the substrate is glass, plastic, metal or painted metal.

32. The article of claim 30 wherein the substrate is glass.

33. An ink-imprinted and reusable multilayer cling film of at least two layers which can cling to substrates having a smooth surface without the use of an adhesive material comprising (A) a first layer of at least one thermoplastic polymer film having an upper smooth surface and a lower surface wherein the upper surface is ink-imprinted; and (B) a second layer which is a polymeric cling film having an upper surface and a lower smooth surface and comprising at least one non-polyvinyl chloride, non-polyurethane thermoplastic elastomer wherein the upper surface of the second layer is in contact with and adhered to the lower surface of the first layer, wherein the cling film has a nucleating agent, and wherein the smooth surfaces have a surface smoothness of from about 0 to about 30 Ra.

34. An ink-imprinted and reusable multilayer cling film of at least two layers which can cling to substrates having a smooth surface without the use of an adhesive material comprising (A) a first layer of at least one thermoplastic polymer film having an upper smooth surface and a lower surface wherein the upper surface is ink-imprinted; and (B) a second layer which is a polymeric cling film having an upper surface and a lower smooth surface and comprising at least one thermoplastic elastomer selected from the group consisting of
  (a) a copolymer comprising ethylene and an alpha-olefin containing from 3 to about 18 carbon atoms, and
  (b) a block copolymer of molecules having rubbery segments and thermodynamically incompatible non-rubbery segments, wherein the upper surface of the second layer is in contact with and adhered to the lower surface of the first layer, wherein the cling film has a nucleating agent, and wherein the smooth surfaces have a surface smoothness of from about 0 to about 30 Ra.

35. The multilayer cling film of claim 34 wherein the elastomer of the second layer comprises a block copolymer of molecules having rubbery segments and thermodynamically incompatible non-rubbery segments, and the non-rubbery segments comprise polymer blocks of substituted and unsubstituted vinyl-substituted aromatic hydrocarbons.

36. The multilayer cling film of claim 35 wherein the rubbery segments are olefin rubbers derived from ethylene/butylene or ethylene/propylene copolymers.

37. The multilayer cling film of claim 34 wherein the second layer comprises thermoplastic polymers and copolymers selected from the group consisting of polyethylene, polypropylene, copolymers of ethylene and at least one alpha-olefin containing from 3 to about 20 carbon atoms, styrene-butadiene-styrene copolymers, styrene-ethylene-butylene-styrene copolymers, styrene-isoprene-styrene copolymers, styrene-ethylene-propylene-styrene copolymers, and mixtures thereof.

* * * * *